United States Patent [19]

Hahn et al.

[11] Patent Number: 5,093,375
[45] Date of Patent: Mar. 3, 1992

[54] BEAD-LIKE EXPANDABLE MOLDING MATERIALS HAVING HIGH HEAT DISTORTION RESISTANCE AND THEIR PREPARATION

[75] Inventors: Klaus Hahn, Kirchheim; Uwe Guhr, Gruenstadt; Hans Hintz, Ludwigshafen; Roland Gellert, Neustadt, all of Fed. Rep. of Germany

[73] Assignee: BASF Aktiengesellschaft, Ludwigshafen, Fed. Rep. of Germany

[21] Appl. No.: 472,809

[22] Filed: Jan. 31, 1990

[30] Foreign Application Priority Data

Feb. 14, 1989 [DE] Fed. Rep. of Germany ....... 3904370

[51] Int. Cl.$^5$ .............................. C08J 9/18; C08J 9/20
[52] U.S. Cl. ........................................ 521/59; 521/56; 521/60; 521/139
[58] Field of Search ...................... 521/139, 56, 60, 59

[56] References Cited

U.S. PATENT DOCUMENTS

| | | | |
|---|---|---|---|
| 4,727,093 | 2/1988 | Allen et al. | 521/59 |
| 4,874,796 | 10/1989 | Allen et al. | 521/60 |
| 4,927,858 | 5/1990 | Joyce et al. | 54/139 |
| 4,927,859 | 5/1990 | Weber et al. | 521/59 |

FOREIGN PATENT DOCUMENTS 0241258 10/1987 European Pat. Off. .
3220856 12/1982 Fed. Rep. of Germany .

OTHER PUBLICATIONS

Patent Abstracts of Japan, JP-A-52 101-268, Aug. 25, 1977, "Heat Resistant Foams Obtained Using Controlled Amounts of Foaming Agent From Styrene (Co)-Polymer and Polyphenylene Ether Resin Mixture".

Primary Examiner—Morton Foelak
Attorney, Agent, or Firm—Oblon, Spivak, McClelland, Maier & Neustadt

[57] ABSTRACT

Bead-like expandable molding materials having high heat distortion resistance contain from 80 to 99% by weight of a styrene polymer, from 1 to 20% by weight of poly-(2,6-dimethyl)-1,4-diphenylene ether and from 3 to 10% by weight of a $C_3$–$C_6$-hydrocarbon as a blowing agent and may contain conventional additives. They are obtained by suspension polymerization of a solution of the polyphenylene ether in styrene.

4 Claims, No Drawings

BEAD-LIKE EXPANDABLE MOLDING MATERIALS HAVING HIGH HEAT DISTORTION RESISTANCE AND THEIR PREPARATION

Foams based on a mixture of styrene polymers and polyphenylene ethers have high heat distortion resistance.

According to DE-A 32 20 856, such foams are prepared by melting the mixture, mixing it with a blowing agent under pressure and letting down the mixture. It is not possible to produce moldings of any desired shape by this process.

In JP-A 52-101268, expandable granules are prepared by impregnating polystyrene/polyphenylene ether granules with less than 3% of a blowing agent. Such granules have a cylindrical shape. When an attempt is made to produce moldings by expanding the granules and then welding the cylindrical foam particles, the moldings have a high content of voids and defects, owing to the large interparticle volume of a bed of the foam particles and their unsatisfactory flow properties.

EP-A 241 258 describes the production of foam particles by extrusion of a polystyrene/polyphenylene ether/blowing agent mixture and comminution of the resulting foam extrudate. Such particles are also unsuitable for the production of moldings since, owing to the large interparticle volume, the moldings cannot be obtained without voids.

It is an object of the present invention to provide expandable molding materials which are suitable for the production of void-free foam moldings. It is a further object of the present invention to improve the oil resistance of such foams. Finally, it is also an object of the present invention to improve the flow properties of the foam particles and to avoid the use of expensive extruders in the preparation.

We have found, surprisingly, that the disadvantages of the prior art are avoided and the stated objects are achieved by bead-like expandable molding materials based on styrene polymers and polyphenylene ethers.

The present invention therefore relates to beadlike expandable molding materials having high heat distortion resistance and containing a) from 80 to 99% by weight of one or more styrene polymers, b) from 1 to 20% by weight of poly-(2,6-dimethyl)-1,4-phenylene ether and c) from 3 to 10% by weight, based on the sum of a) and b), of a $C_3$-$C_6$-hydrocarbon as a blowing agent, with or without d) conventional additives in effective amounts.

The present invention furthermore relates to a process for the preparation of these expandable molding materials, wherein a solution of poly-(2,6-dimethyl)-1,4-phenylene ether in styrene is polymerized in aqueous suspension and the blowing agent is added during or after the polymerization.

An essential feature of the novel expandable molding materials is their bead shape. The shape is due to the preparation by suspension polymerization. The particles have an almost spherical shape. The beads have a mean diameter of about 0.1-6 mm, preferably 0.2-4 mm, in particular 0.3-3 mm.

Suitable styrene polymers a) are polystyrene and copolymers which contain not less than 50% by weight of styrene as copolymerized units. Examples of suitable comonomers are α-methylstyrene, styrenes which are halogenated in the nucleus, styrenes which are alkylated in the nucleus, acrylonitrile, esters of (meth)acrylic acid with alcohols of 1 to 8 carbon atoms, N-vinyl compounds, such as N-vinylcarbazole, and maleic anhydride. The styrene polymer advantageously contains a small amount of a crosslinking agent as copolymerized units, i.e. a compound having more than one polymerizable double bond, preferably two polymerizable double bonds, such as divinylbenzene, butadiene or butanediol diacrylate. The crosslinking agent is generally used in an amount of from 0.005 to 0.05 mol %, based on styrene. Styrene polymers which contain not less than 5, in general 5-17, preferably 5-10, % by weight of acrylonitrile as copolymerized units lead to molding materials which have high oil resistance. For this purpose, a mixture of polystyrene and a styrene-soluble styrene/acrylonitrile copolymer, in particular a mixture of 50-83, preferably 60-80, % by weight of polystyrene and 17-50, in particular 20-40, % by weight of a styrene/acrylonitrile copolymer containing about 15-35, in particular 20-30, % by weight of copolymerized acrylonitrile is preferably used as the styrene polymer.

The styrene polymer a) is used in amounts of 80-99, preferably 85-98, in particular 90-97, % by weight, based on the sum of a) and b).

The expandable molding materials contain, as a further component b), from 1 to 20, preferably from 2 to 15, in particular from 3 to 10, % by weight of poly-(2,6-dimethyl)-1,4-phenylene ether.

The molding materials contain, as blowing agents, from 3 to 10, preferably from 5 to 8, % by weight of a $C_3$-$C_6$-hydrocarbon, such as propane, butane, isobutane, n-pentane, isopentane, neopentane and/or hexane. A commercial pentane mixture is preferably used.

The expandable molding materials may contain, as further additives, conventional colorants, fillers, stabilizers, flameproofing agents, synergistic agents, nucleating agents, lubricants and the like in conventional effective amounts.

The bead-like expandable molding materials are prepared by suspension polymerization. For this purpose, the polyphenylene ether or a mixture of polyphenylene ether and polystyrene, as available in the form of a commercial product, and if necessary the styrene/acrylonitrile copolymer are dissolved in styrene, further copolymers and any crosslinking agent may be added and this solution is polymerized in aqueous suspension, advantageously with the addition of a conventional suspending agent. The blowing agent is initially taken at the beginning of the polymerization or is added in the course of the polymerization. However, it can also be added to the mixture after the polymerization is complete. The resulting expandable bead-like polymers are then separated off from the aqueous phase, washed and dried.

The expandable molding materials can be expanded in a known manner in conventional pre-expanders with hot air or steam to give bead-like foam particles. The foam beads can be welded in a conventional manner by heating in closed molds which are not gas-tight to give moldings.

In the Examples which follow, parts are by weight.

EXAMPLE 1

In a pressure-resistant stirred kettle, a mixture of 200 parts of water, 0.1 part of sodium pyrophosphate, 0.15 part of tert-butyl perbenzoate, 0.45 part of benzoyl peroxide, 100 parts of a solution of 5 parts of a blend of poly-(2,6-dimethyl)-1,4-phenylene oxide and polystyrene (weight ratio 80:20) and 0.01 part of divinylbenzene in 95 parts of styrene, 7 parts of pentane and 3 parts of a 10% strength aqueous solution of polyvinylpyrrolidone was heated to 90° C. while stirring, kept at this temperature for 5 hours and then heated for 2 hours at 100° C. and for a further 2 hours at 120° C. After cooling, the resulting bead polymer having a mean bead diameter of 0.8 mm was separated off from the aqueous phase, washed and dried. The product thus obtained was expanded in a commercial continuous Rauscher-type stirred pre-expander with flowing steam to give foam beads (bulk density 20 g/l). After storage for 24 hours, the foam beads were introduced into a Rauscher-type block mold and welded to a block in the course of 20 seconds by treatment with steam under 1.8 bar. The interior of the foam was completely free of voids and defects The heat distortion resistance according to DIN 53,424 was 111° C.

In comparison, a foam produced according to JP-A 52 301 268 from corresponding polystyrene/polyphenylene ether granules by subsequent impregnation with pentane followed by expansion and welding in a mold had many voids and defects in its interior.

EXAMPLE 2

The procedure described in Example 1 was followed, except that divinylbenzene was not used. The foam obtained was completely free of voids and defects in its interior. The heat distortion resistance according to DIN 53,424 was 108° C.

EXAMPLE 3

The procedure described in Example 1 was followed, except that 100 parts of a solution of 10 parts of a blend of poly-(2,6-dimethyl)-1,4-phenylene oxide and polystyrene (weiqht ratio 80:20) and 0.01 part of divinylbenzene in 90 parts of styrene were used. The foam obtained was completely free of voids and defects. The heat distortion resistance was 120° C.

EXAMPLE 4

The procedure described in Example 3 was followed, except that divinylbenzene was not used. The foam was completely free of voids and defects. The heat distortion resistance was 115° C.

EXAMPLE 5 (Comparison)

The procedure described in Example 1 was followed, except that poly-(2,6-dimethyl)-1,4-phenylene oxide was not used. The foam had a distortion resistance of 102° C.

EXAMPLE 6

The procedure described in Example 1 was followed, except that 100 parts of a solution of 5 parts of a blend of poly-(2,6-dimethyl)-1,4-phenylene oxide and polystyrene (weight ratio 80:20) and 25 parts of a styrene/acrylonitrile copolymer (weight ratio 70:30) and 0.01 part of divinylbenzene in 70 parts of styrene were used.

The heat distortion resistance of the foam was 112° C. To test the oil resistance, samples of the foam (5×5×5 cm) were stored in fuel oil and in diesel oil, in accordance with DIN 53,428. After storage for 72 hours, the foam was found to be unchanged.

EXAMPLE 7

The procedure described in Example 6 was followed, except that divinylbenzene was not used.

The foam had a heat distortion resistance of 110° C. and was resistant to fuel oil and diesel oil.

We claim:

1. A bead-like expandable molding material prepared by suspension polymerization, having high heat distortion resistance and containing
   a) from 80 to 90% by weight of one or more styrene polymers,
   b) from 1 to 20% by weight of poly-(2,6-dimethyl)-1,4-phenylene ether and
   c) from 3 to 10% by weight, based on the sum of a) and b), of a $C_3$–$C_6$-hydrocarbon as a blowing agent, with or without
   d) conventional additives in effective amounts, wherein a mixture of
   a1) from 50 to 83% by weight of polystyrene and
   a2) from 17 to 50% by weight of a styrene-soluble styrene/acrylonitrile copolymer in which the content of acrylonitrile is not less than 5% by weight, based on the sum of a1) and a2) is used as component a).

2. The bead-like expandable molding material of claim 1, wherein component a) is prepared using from 0.005 to 0.05 mol %, based on styrene, of a crosslinking agent.

3. A process for the preparation of the expandable molding material of claim 1, wherein a solution of poly-(2,6-dimethyl)-1,4-phenylene ether and a styrene/acrylonitrile copolymer in styrene is polymerized in aqueous suspension in the presence of a blowing agent, and the blowing agent is added during or after the polymerization.

4. The process of claim 3, wherein from 0.005 to 0.05 mol %, based on styrene, of a crosslinking agent is used in the aqueous suspension.

* * * * *